United States Patent [19]
Van Gelder

[11] 3,709,170
[45] Jan. 9, 1973

[54] SLUDGE FEED SYSTEM FOR INCINERATOR

[75] Inventor: Louis Ralph Van Gelder, Western Springs, Ill.

[73] Assignee: Chicago Bridge & Iron Company, Oak Brook, Ill.

[22] Filed: July 28, 1971

[21] Appl. No.: 166,710

[52] U.S. Cl. .................................... 110/8 R, 110/110
[51] Int. Cl. .................................................. F23g 5/00
[58] Field of Search .............. 110/8 R, 15, 110, 182.5

[56] References Cited

UNITED STATES PATENTS

| | | | |
|---|---|---|---|
| 2,116,573 | 5/1938 | Harrington | 110/15 |
| 3,375,794 | 4/1968 | Albertson et al. | 110/8 |
| 3,472,185 | 10/1969 | Burden, Jr. | 110/110 X |

Primary Examiner—Kenneth W. Sprague
Attorney—Charles J. Merriam, William A. Marshall, Norman M. Shapiro, Jerome B. Klose, Basil P. Mann, Clyde V. Erwin, Jr., Alvin D. Shulman, Edward M. O'Toole, Allen H. Gerstein, Owen J. Murray, Donald E. Egan and Nate T. Scarpelli

[57] ABSTRACT

Sludge feed system for a reactor having a nozzle, and a conduit communicating with the outside of the reactor and the nozzle for feeding sludge to the nozzle under pressure, said nozzle having a mouth in communication with the interior of the reactor for forming the sludge into a thin layer which breaks up in the reactor.

Method of feeding sludge of limited fluidity into a reactor by shaping the sludge into a soft layer which is much wider than thick, and feeding the layer directly into the reactor.

14 Claims, 4 Drawing Figures

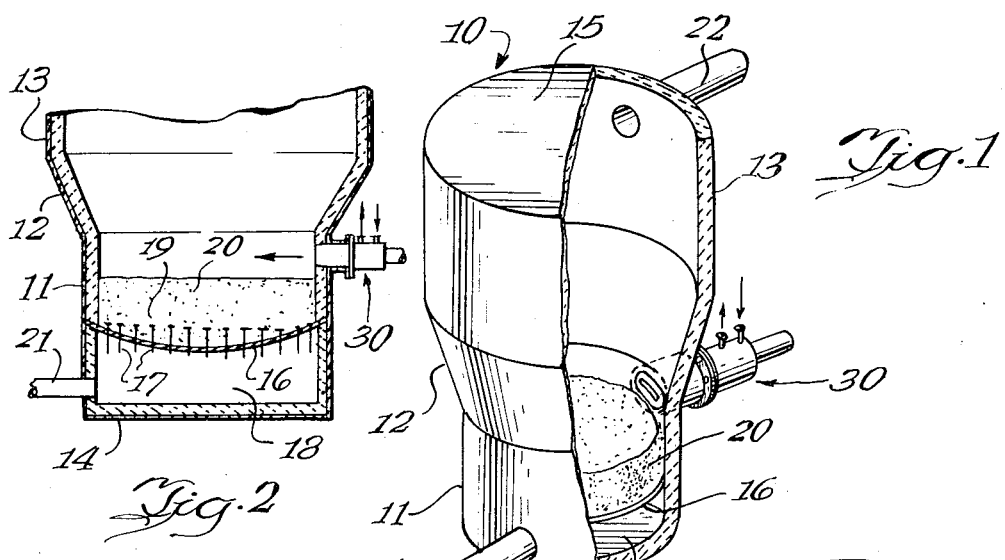
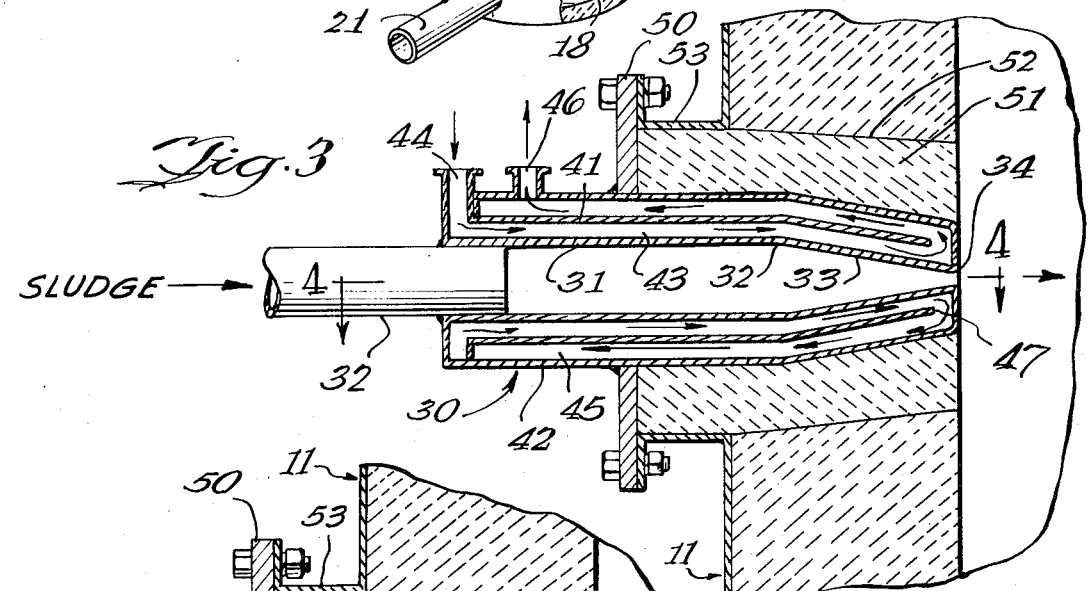
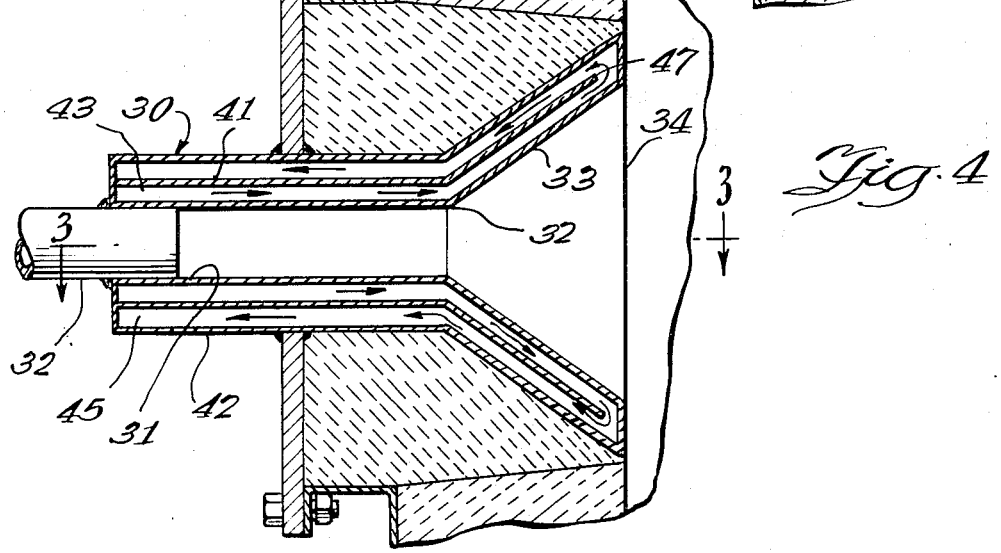

SLUDGE FEED SYSTEM FOR INCINERATOR

This invention relates to improvements in reactors used for treating sludge materials as well as novel methods of feeding sludges to such reactors. More particularly, this invention is concerned with the feeding of sludges in the form of a disintegrable thin layer into a reactor.

A considerable number of processing operations result in the formation of sludges. By sludge is meant a material which contains a substantial amount of solid matter intermixed with a liquid. Physically, sludges can range from rather free-flowing materials much like thick liquids to those which are more like solid materials than liquids.

Sludges often require that they be processed in reactors to convert them to other physical or chemical forms or to different substances or simply to facilitate their disposal in a convenient efficient manner. Quite often the treatment of sludges in a reactor necessitates that they be subjected to rather elevated temperatures. For example, waste sludges of various types are quite often burned in a reactor either autogenously or by the use of an auxiliary fuel to dispose of them. Fluidized bed reactors are sometimes used for this purpose since they facilitate efficient and economical combustion of the sludge.

Sludges which are quite liquid and flow readily can be fed to a suitable reactor by relatively simple means, such as through a spray head which can be augmented if desired by air under pressure to facilitate the spraying operation and dispersal of the sludge in the reactor. Such systems are not considered practical, however, for feeding sludges of quite limited fluidity, or those which are essentially soft solids, to a reactor because of the extremely high pressure needed to force them through a spray system. An alternative method proposed for feeding thick or heavy sludges which are very low in fluidity into a reactor employs a screw feed pipe system. See U.S. Pat. No. 3,319,587 for such a system. This type of feed system, however, is expensive and is believed unnecessary, particularly for feeding sludges which are not of the extreme solid type, but which are still quite thick or have low fluidity. A need therefore exists for means to feed sludges of limited fluidity to a reactor for appropriate treatment which is inexpensive to fabricate and use.

According to the present invention there is provided an improvement in enclosed reactors in which a sludge of limited fluidity is treated or reacted at an elevated temperature which comprises a sludge feed system having a nozzle and a conduit communicating with the outside of the reactor for feeding sludge to the nozzle under pressure, said nozzle having an inlet in communication both with the conduit and with a transition element section of the nozzle which terminates in a mouth in communication with the interior of the reactor such that the nozzle mouth has an opening substantially greater in a first dimension, such as its width, than a second dimension normal to the first dimension, such as the mouth height. The mouth accordingly can be considered as of an oblong shape when viewed in transverse cross-section. When a sludge of limited fluidity is fed through the conduit and into and out of the nozzle, it emerges in the shape of a soft layer which is much wider than it is thick. The soft sludge layer is of limited inherent strength and, under the normal conditions of reactor use, the sludge layer disintegrates into small pieces which then can be in the reactor. The described feed system is particularly applicable for feeding sludges into a fluidized bed reactor because the turbulent action of the fluidized bed aids in the disintegration of the soft sludge layer and its further abrasion into small particles as processing continues. This is particularly so in the case of a sludge from a sewage treatment plant which is to be disposed of through combustion in a fluidized bed reactor. Furthermore, the sludge layer is readily disintegrated whether the layer is fed into the fluidized bed itself or into the freeboard area of the reactor above the fluidized bed.

Nozzles of particular use in practicing the invention are those which have a mouth opening which is much wider than it is high and particularly a nozzle mouth which is at least five times, and desirably at least ten times, as wide as it is high. In addition, the nozzle advisably has a transition inlet opening which is approximately the same dimension in height as in width, such as is inherently present in an opening which is circular or square. To facilitate movement of the sludge through the nozzle, it is advisable for the nozzle transition element to have a smoothly contoured interior surface extending from the transition element inlet to the nozzle mouth so that the sludge may flow forwardly in the nozzle transition element and be shaped or formed into a progressively thinner layer as it moves into proximity with the nozzle mouth. Furthermore, it is considered that the most suitable nozzle has a mouth with a cross-sectional area about the same as the area of the nozzle transition element inlet so as to thereby minimize the backup pressure needed to move the sludge through and out the nozzle.

Another embodiment of the invention employs a jacket about the nozzle through which a cooling fluid may be circulated to control the nozzle temperature to protect it against overheating and to retard or prevent drying of the sludge during its passage through the nozzle to eliminate the possibility of dried sludge cake sticking in the nozzle and obstructing sludge flow therethrough. The jacket around the nozzle furthermore is advisably contructed to permit circulation of water as the cooling fluid.

The nozzle provided by this invention is advisably installed in the reactor by means which permits its ready removal therefrom in order to service the nozzle in case it becomes plugged, worn or damaged. The nozzle cooling means can be removed with the nozzle when it is integrally formed therewith or it can be removed independently when constructed as a separate unit.

The invention will now be described in conjunction with the attached drawings in which:

FIG. 1 is an isometric view, partially broken away, showing a reactor provided with a nozzle for feeding sludge in a thin layer to the interior thereof;

FIG. 2 is a vertical sectional view through the lower part of the reactor of FIG. 1;

FIG. 3 is a vertical sectional view through the nozzle and adjacent reactor wall taken on the line 3—3 of FIG. 4; and FIG. 4 is a top sectional view taken along the line 4—4 of the nozzle shown in FIG. 3.

So far as is practical, the various elements which appear in the different views of the drawing will be identified by the same numbers.

With reference to FIGS. 1 and 2, enclosed reactor 10 has a lower cylindrical portion 11, a central conical section 12 and an upper cylindrical portion 13. The described reactor portions comprise an exterior metal shell with a suitable refractory material lining the interior surface thereof, particularly if the reactor is to be employed in high temperature reactions or treatments. The bottom 14 of the reactor and the top 15 are of similar construction to the reactor vertical walled portions already described. Reactor 10 is typical of the type used in fluidized bed treatments and particularly in the combustion of waste materials.

A constriction plate 16 spans the horizontal interior area defined by the lower cylindrical portion 11 of the reactor support. The space between the constriction plate and the reactor bottom constitutes air box 18. A plurality of vertical tubes 17, in the constriction plate, communicate at their lower ends with air box 18. The upper ends of tubes 17, which extend above constriction plate 16, terminate in horizontally located small tubular sections 19 through which air is expelled from the air box under pressure to fluidize particulate bed 20 located in the reactor. Conduit 21 feeds air or hot gases or whatever gas is appropriate to the air box. Conduit 22 in the upper part of the reactor is used to withdraw gases and products of combustion from the reactor.

Nozzle 30 is positioned so that its mouth is in communication with the interior of reactor 10. As shown in FIGS. 1 and 2, the nozzle mouth is so positioned in the lower portion 11 of the reactor as to be slightly above the top surface of the fluidized bed 20. However, the nozzle can be so located as to deliver sludge being fed from the mouth directly into the fluidized bed.

With reference to FIGS. 3 and 4, nozzle 30 has a tubular portion 31 which communicates with conduit 32. Tubular section 31 is circular in cross-section and its inner end joins inlet end 32 of nozzle transition element 33 which terminates in nozzle transition element mouth 34. The inlet end 32 of transition element 33 is circular in cross-section and progressively becomes oval and finally terminates in mouth 34 which is shaped in the form of an elongated rectangle which is much wider than it is high. As shown in FIG. 3, the top and bottom walls of transition element 33 converge towards the nozzle mouth while as shown in FIG. 4 the opposing side walls of the transition element diverge towards the nozzle mouth. The smooth contour of the interior surface of transition element 33 serves to progressively shape or form a sludge passing through it into a wider and thinner layer as it moves forward so that it is ultimately expelled from the nozzle mouth in a thin disintegratable layer which breaks up into pieces in the reactor.

Nozzle mouth 34 is advisably positioned to be approximately flush with the reactor interior surface to avoid undue abrasion of it by the dynamic activity of the fluidized bed.

It is advisable, although not essential in all embodiments, to provide means to regulate the temperature around and in the nozzle. This can be accomplished by suitable jacket means provided adjacent to the nozzle through which a suitable fluid can be circulated for temperature control of the nozzle. The nozzle embodiment as shown in the drawings, with reference to FIGS. 3 and 4 in particular, is provided with an integral jacket. Interior wall 41 is spaced away from the wall defining tubular portion 31 of the nozzle and the wall of transition element 33 to provide a path 43 for inward flow of cooling fluid supplied to the jacket through inlet opening 44. Jacket interior dividing wall 41 is surrounded by spaced apart exterior wall 42 thereby defining a path 45 for return flow of cooling fluid to exit opening 46. The forward end 47 of inner wall 41 terminates just short of the end of the nozzle to provide a pathway for the cooling fluid to flow from path 43 to path 45. Water is the preferred coolant and in the case of sewage sludge serves to prevent the sludge from drying into a hard cake before it is expelled into the reactor. In addition, the coolant prevents the nozzle from becoming damaged through contact with high temperatures in the reactor.

To facilitate insertion of the nozzle in the reactor and to aid its removal therefrom for servicing and repair, an opening is provided in the reactor wall to receive the nozzle and suitable attaching means. Thus, as shown in FIGS. 3 and 4, a plate 50 is positioned normal to and joined to the outer wall 42 of the cooling jacket. Insulation material is positioned around the inner end of the nozzle and is suitably secured thereto and to plate 50. The inner end of insulation 52 is suitably tapered so that when it is placed in the reactor opening it will fit tightly in contact with the opening surface in the reactor wall. A cooperating flange 53 is provided around the reactor opening for bolting plate 50 thereto so that the entire nozzle and auxiliary supporting structure can be securely fixed in a removable arrangement in and to the reactor.

It is considered advisable to dimension the nozzle mouth to have a width at least five times, and better at least ten times, greater than the mouth height to shape the sludge into a suitably thin layer. More specifically, it is usually appropriate to eject the sludge as a layer of no more than two inches thickness, and advisably of no more than one inch thickness. For optimum results it presently appears advisable to have the layer no more than one-half inch thick and about 12 to 15 inches wide.

A specific nozzle for feeding 1,700 pounds per hour of wet sewage sludge of about 28 to 33 percent solids in water to a fluidized bed reactor can have a transition element circular inlet of 3 inches diameter and a rectangular mouth one-half inch high and 14 inches wide. The sludge layer ejected from such a nozzle is not self supporting and breaks up as it leaves the nozzle mouth. The scrubbing action of the fluidized bed will break the sludge pieces into smaller particles which will completely burn.

While the present invention has been described by reference to illustrative examples various modifications will be apparent to those skilled in the art and any such modifications are intended to be within the spirit and scope of the invention as defined by the appended claims.

What is claimed is:

1. In an enclosed reactor in which a sludge of limited fluidity is treated or reacted at an elevated temperature, the improvement comprising:

a sludge feed system having a nozzle, and a conduit communicating with the outside of the reactor and the nozzle for feeding sludge to the nozzle under pressure;

said nozzle having a mouth in communication with the interior of the reactor;

the nozzle mouth having an opening substantially greater in a first dimension than a second dimension normal to the first dimension.

2. In a reactor according to claim 1, the improvement in which the nozzle has a first dimension at least five times larger than the second dimension.

3. In a reactor according to claim 1, the improvement in which the nozzle has a transition element with an inlet thereto having a cross-section about as wide as it is high and which ends about with the nozzle mouth, and the interior surface of the transition element communicates smoothly from its inlet to the nozzle mouth.

4. In a reactor according to claim 1, the improvement in which the nozzle has an inlet which is circular and the nozzle mouth is oblong.

5. In a reactor according to claim 1, the improvement in which the nozzle has jacket means for circulating a cooling fluid therein.

6. In a reactor according to claim 1, the improvement in which the nozzle is removably positioned in the reactor wall.

7. In a reactor according to claim 1, the improvement in which the reactor employs a fluidized bed and the nozzle mouth is positioned to feed sludge therefrom above the fluidized bed.

8. In a reactor according to claim 1, the improvement in which the nozzle mouth has a cross-sectional area about equal to the cross-sectional area of an inlet of the nozzle.

9. The method of feeding a sludge of limited fluidity into a reactor which comprises shaping the sludge, by means of a wide-mouthed nozzle, into a soft layer which is much wider than thick, and feeding the layer directly into the reactor.

10. The method of claim 9 in which the layer is no more than two inches thick and is at least five times wider than thick.

11. The method of claim 9 in which the sludge is supplied from a conduit to an inlet in the nozzle and the nozzle inlet has a height about equal to its width, and the nozzle interior extends smoothly from the nozzle inlet to the nozzle mouth.

12. The method of claim 9 in which the reactor contains a fluidized bed, and the layer of sludge is fed to the reactor above the bed.

13. The method of claim 9 in which the sludge is from a sewage treatment plant.

14. The method of claim 9 in which the nozzle has a jacket through which cooling fluid is passed during formation of the sludge layer.

* * * * *